United States Patent
Xu

(10) Patent No.: US 10,671,376 B2
(45) Date of Patent: Jun. 2, 2020

(54) SERVER PROGRAM HOT UPGRADING METHOD AND DEVICE

(71) Applicant: SHENZHEN SKYWORTH-RGB ELECTRONIC CO., LTD., Shenzhen (CN)

(72) Inventor: Zeshui Xu, Shenzhen (CN)

(*) Notice: Subject to any disclaimer, the term of this patent is extended or adjusted under 35 U.S.C. 154(b) by 0 days.

(21) Appl. No.: 15/412,276

(22) Filed: Jan. 23, 2017

(65) Prior Publication Data

US 2017/0269926 A1 Sep. 21, 2017

Related U.S. Application Data

(63) Continuation of application No. PCT/CN2016/076333, filed on Mar. 15, 2016.

(30) Foreign Application Priority Data

Mar. 15, 2016 (CN) .......................... 2016 1 0146666

(51) Int. Cl.
    *G06F 8/65* (2018.01)
    *G06F 8/656* (2018.01)
    *H04L 12/24* (2006.01)
    *G06F 9/4401* (2018.01)

(52) U.S. Cl.
    CPC ............ *G06F 8/656* (2018.02); *G06F 9/4416* (2013.01); *G06F 9/4418* (2013.01); *H04L 41/082* (2013.01)

(58) Field of Classification Search
    CPC ................................................ G06F 8/30–78
    See application file for complete search history.

(56) References Cited

U.S. PATENT DOCUMENTS

| | | | | |
|---|---|---|---|---|
| 7,188,163 | B2* | 3/2007 | Srinivasan | G06F 9/44505 709/220 |
| 9,229,707 | B2* | 1/2016 | Borissov | G06F 8/67 |
| 9,405,530 | B2* | 8/2016 | Islam | G06F 8/65 |
| 9,851,996 | B2* | 12/2017 | Kochar | G06F 9/45558 |
| 9,891,909 | B2* | 2/2018 | Konrad | G06F 17/30578 |
| 2003/0101245 | A1* | 5/2003 | Srinivasan | G06F 9/44505 709/221 |

(Continued)

FOREIGN PATENT DOCUMENTS

| | | |
|---|---|---|
| CN | 103677927 A | 3/2014 |
| CN | 104102502 A | 10/2014 |

(Continued)

OTHER PUBLICATIONS

PCT/CN2016/076333 International Search Report (dated Oct. 10, 2016) (in Chinese).

*Primary Examiner* — Philip Wang
(74) *Attorney, Agent, or Firm* — W&K IP

(57) ABSTRACT

The present disclosure provides a server program hot upgrading method comprising following steps: the server controlling a processing instance A which is currently running to stop receiving business requests and to continue processing a current business request when the server program upgrades; the server creating a new processing instance B by the updated server program, to process the business requests received by the processing instance B; the server controlling the processing instance A to exit after the processing instance A has finished processing the business request, and the server program finishing hot upgrading.

4 Claims, 6 Drawing Sheets

(56) References Cited

U.S. PATENT DOCUMENTS

| | | | | |
|---|---|---|---|---|
| 2003/0135509 A1* | 7/2003 | Davis | .................. | H04L 63/0227 |
| 2006/0059479 A1* | 3/2006 | Tumati | .................... | G06F 8/656 |
| | | | | 717/168 |
| 2007/0255764 A1* | 11/2007 | Sonnier | .................... | G06F 8/656 |
| 2009/0144721 A1* | 6/2009 | Wagner | .................... | G06F 8/65 |
| | | | | 717/172 |
| 2010/0162226 A1* | 6/2010 | Borissov | .................... | G06F 8/67 |
| | | | | 717/173 |
| 2013/0194973 A1* | 8/2013 | Farkas | .................. | H04L 41/082 |
| | | | | 370/255 |
| 2014/0351807 A1* | 11/2014 | Wen | ........................ | G06F 8/656 |
| | | | | 717/173 |
| 2016/0283221 A1* | 9/2016 | Kochar | ............... | G06F 9/45558 |
| 2016/0364226 A1* | 12/2016 | Takano | .................... | G06F 8/65 |
| 2017/0185392 A1* | 6/2017 | Konrad | .................... | G06F 8/67 |
| 2018/0081674 A1* | 3/2018 | Zhang | ........................ | G06F 8/65 |

FOREIGN PATENT DOCUMENTS

| | | |
|---|---|---|
| CN | 104461628 A | 3/2015 |
| CN | 105100232 A | 11/2015 |

* cited by examiner

SERVER PROGRAM HOT UPGRADING METHOD AND DEVICE

CROSS-REFERENCE TO RELATED APPLICATIONS

This application is a continuation of International Patent Application No. PCT/CN2016/076333 with a filing date of Mar. 15, 2016, designating the United States, and further claims priority to Chinese Patent Application No. 201610146666.7 with a filing date of Mar. 15, 2016. The content of the aforementioned application, including any intervening amendments thereto, are incorporated herein by reference.

TECHNICAL FIELD

The subject matter relates to computer technology, and particularly, to a server program hot upgrading method and a server program hot upgrading device.

BACKGROUND OF THE PRESENT INVENTION

With a development of network technology, backend servers are playing a more and more important role in network environment. User requirements are also increased which causes an improved demand for network backend servers. At the same time, the functions of the network backend server are constantly updated. Thus, the network backend server programs need to be constantly upgraded to meet the user requirements.

Previously, the backend server disconnects the client each time the backend server upgrades and restarts, thereby causing an interruption of the current service connection and affecting the client's experience. At the moment the backend server restarts, all operations including file operation are forced to be interrupted, thereby causing a small amount of data to be loss. More seriously, if the interruption occurs when some key data is operated, the data cannot keep its integrity, thus causing the data to be lost and generate errors.

Take the client being connected to the backend server for registration for example. When a user uses the client to connect to the backend server for registration, if the backend server upgrades and restarts, the client will remind the user according to the connection state that the client is disconnected with the backend server. The client cannot be connected to the backend server to continue the registration before the backend server restarts. After the background server updates and restarts, the user needs to perform the registration again. Furthermore, since the registration is forced to be interrupted at the time the backend server updates and restarts, the user may not correctly continue the registration.

In another case, when the user has been input key information including username and the backend server updates and restarts, the key information is uploaded to the backend server and stored in the database. After the backend server updates and restarts, the user needs to perform the registration again and input the same username. Since the username has been existed in the backend server, the user may be reminded that the username has been registered. However, the registration information corresponding to the username is incomplete, the user cannot use the username to log in the backend server, thus making the username to be ownerless and to occupy system resources, and also resulting that the user cannot use a satisfied username.

SUMMARY OF PRESENT INVENTION

The main object of the present disclosure is to provide a server program hot upgrading method, to solve the problems that the data is lost and incomplete when the backend server updates and restarts.

To achieve that purpose, the present disclosure provides a server program hot upgrading method including following steps:

the server controls a processing instance A which is currently running to stop receiving business requests and to continue processing a current business request when the server program upgrades;

the server creates a new processing instance B by the updated server program, to process the business requests received by the processing instance B;

the server controls the processing instance A to exit after the processing instance A has finished processing the business request, and the server program finishes hot upgrading.

Preferably, the step of "the server controlling a processing instance A which is currently running to stop receiving business requests and to continue processing a current business request when the server program upgrades" further comprises following step:

the server controls a daemon process to disable a receiving functionality of the processing instance A which is currently running to cause the processing instance A to stop receiving the business requests, and further controls the processing instance A to continue processing the current business request, when the server program upgrades.

Preferably, the step of "the server creating a new processing instance B by the updated server program, to process the business requests received by the processing instance B" further comprises following step:

the daemon process of the server program creates the new processing instance B by the updated server program and binds the processing instance B to a business request access port, and further controls the processing instance B to receive and to process the business requests.

Preferably, the step of "the server controlling a processing instance A which is currently running to stop receiving business requests and to continue processing a current business request when the server program upgrades" further comprises following step:

the server controls an access stratum to stop sending the business requests to the processing instance A which is currently running, and further controls the processing instance A which is currently running to continue processing the current business request, when the server program upgrades.

Preferably, the step of "the server creating a new processing instance B by the updated server program, to process the business requests received by the processing instance B" further comprises following step.

The server creates the new processing instance B by the updated server program, controls the access stratum to send the received business requests to the processing instance B, and controls the processing instance B to receive and to process the business requests.

In addition, to achieve that purpose, the present disclosure further provides a server program hot upgrading device including:

a stop receiving module configured to control a processing instance A which is currently running to stop receiving business requests and to continue processing a current business request when the server program upgrades;

a new instance creating module configured to create a new processing instance B by the updated server program, to process the business requests received by the processing instance B;

an exiting after finish module configured to control the processing instance A to exit after the processing instance A has finished processing the business request, and the server program finishes hot upgrading.

Preferably, the stop receiving module further comprises:

a disable receiving unit configured to control a daemon process of the server program to disable a receiving functionality of the processing instance A which is currently running to cause the processing instance A to stop receiving the business requests, and further configured to control the processing instance A to continue processing the current business request, when the server program upgrades.

Preferably, the new instance creating module further comprises:

a creating and binding unit configured to control the daemon process of the server program to create the new processing instance B by the updated server program and bind the processing instance B to a business request access port, and further configured to control the processing instance B to receive and to process the business request.

Preferably, the stop receiving module further comprises:

a stop sending business request unit configured to control an access stratum to stop sending the business requests to the processing instance A which is currently running, and further control the processing instance A which is currently running to continue processing the current business request, when the server program upgrades.

Preferably, the new instance creating module further comprises:

a creating and sending unit configured to create the new processing instance B by the updated server program, control the access stratum to send the received business requests to the processing instance B, and control the processing instance B to receive and to process the business requests.

The server program hot upgrading method and device provided by the present disclosure creates the new processing instance by the upgraded server program to process new business requests. The old processing instance continues processing the current business request and then exits. Thus, the present disclosure can prevent data from being losing when the server program upgrades, allow the server program to finish hot upgrading, and ensure that data is complete when the server program upgrades. The hot upgrade process of the server program is transparent to user, which may not affect user's experience.

The technical solution of the present invention is hereinafter described in detail with reference to the accompanying drawings.

DETAILED DESCRIPTION OF PREFERRED EMBODIMENTS

It should be appreciate that the embodiments described herein are only intended to illustrate, but not to limit the present disclosure.

The technical solution of the present disclosure comprises: the server controls a processing instance A which is currently running to stop receiving business requests and to continue processing a current business request when the server program upgrades; the server creates a new processing instance B by the updated server program, to process the business request received by the processing instance B; the server controls the processing instance exit after the processing instance A has finished processing the business request, and the server program finishes hot upgrading.

Previously, the server needs to restart when the server program upgrades. The server may disconnect the client when the server upgrades and restarts, thereby causing an interruption of the current service connection and a small amount of data to be loss, thus, the data cannot keep its integrity.

The present disclosure provides a technical solution that the server doesn't need to restart when the server program upgrades. No interruption of the service connection occurs when the server program hot upgrades, thereby preventing the data from being lost which is caused by an interruption of the operations including file operation when the interruption of the service connection happens, and allowing the data to keep its integrity.

Figure 1:
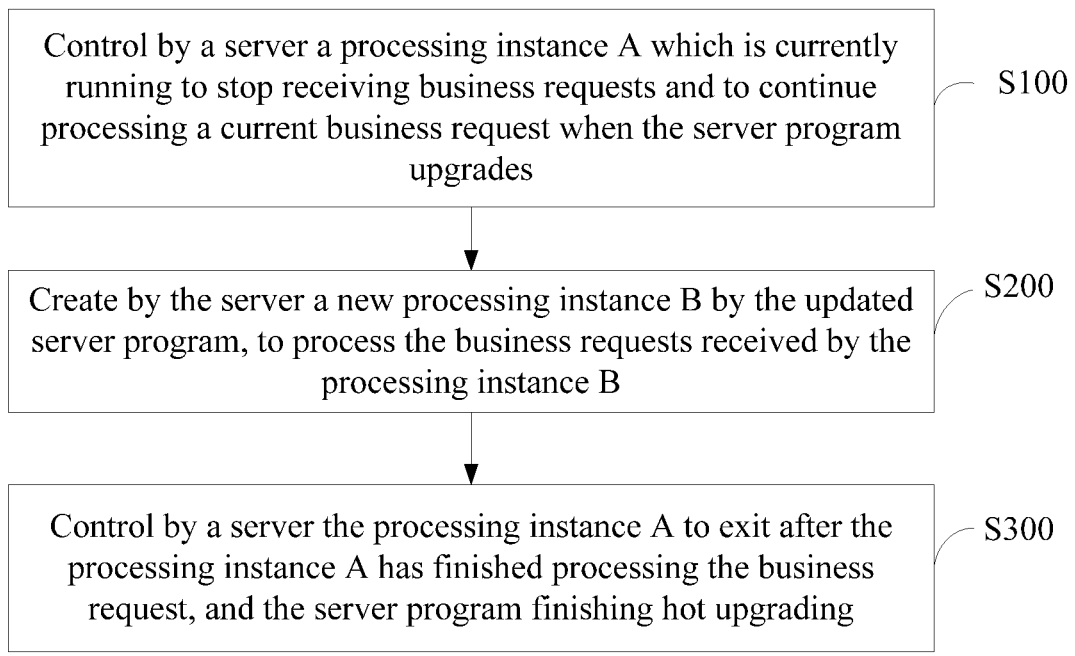
FIG. 1 is a flowchart of a first embodiment of a server program hot upgrading method.

FIG. 1 illustrates a first embodiment of a server program hot upgrading method comprising following steps:

At step S100, the server controls a processing instance A which is currently running to stop receiving business requests and to continue processing a current business request when the server program upgrades;

The server keeps running the processing instance A which is currently running (that is, an old processing instance) and controls the processing instance A to continue processing the current business request when the server program upgrades, thereby preventing the processing instance A to the process new business requests. Thus, the processing instance A stops receiving the new business requests.

At step S200, the server creates a new processing instance B by the updated server program, to process the business requests received by the processing instance B;

The server creates the new processing instance B by the updated server program. When the new processing instance B is created, the server controls the new processing instance B to process the new business requests, thereby preventing the service connection from being interrupted when the server program upgrades. Thus, the user cannot sense that the server program upgrades.

At step S300, the server controls the processing instance A to exit after the processing instance A has finished processing the business request, and the server program finishes hot upgrading.

The server controls the processing instance A to exit after the processing instance A has finished processing the business request, and the server program finishes hot upgrading. The new business requests are processed by the processing instance B. That is, after the server program upgrades, there is only the processing instance B which processes the new business requests. It is foreseeable that the occupied resources are released when the processing instance A exits.

In the embodiment, the new processing instance is created which processes the new business requests when the server program upgrades, at the same time, the old processing instance continues processing the current business request. Thereby, the server doesn't need to restart when the server program upgrades, and no interruption of the service connection occurs. Thus, the user cannot sense that the server program upgrades. Furthermore, since the server doesn't need to restart, thus preventing the data from being lost which is caused by an interruption of operations including the file operation when the server restarts.

Figure 2:
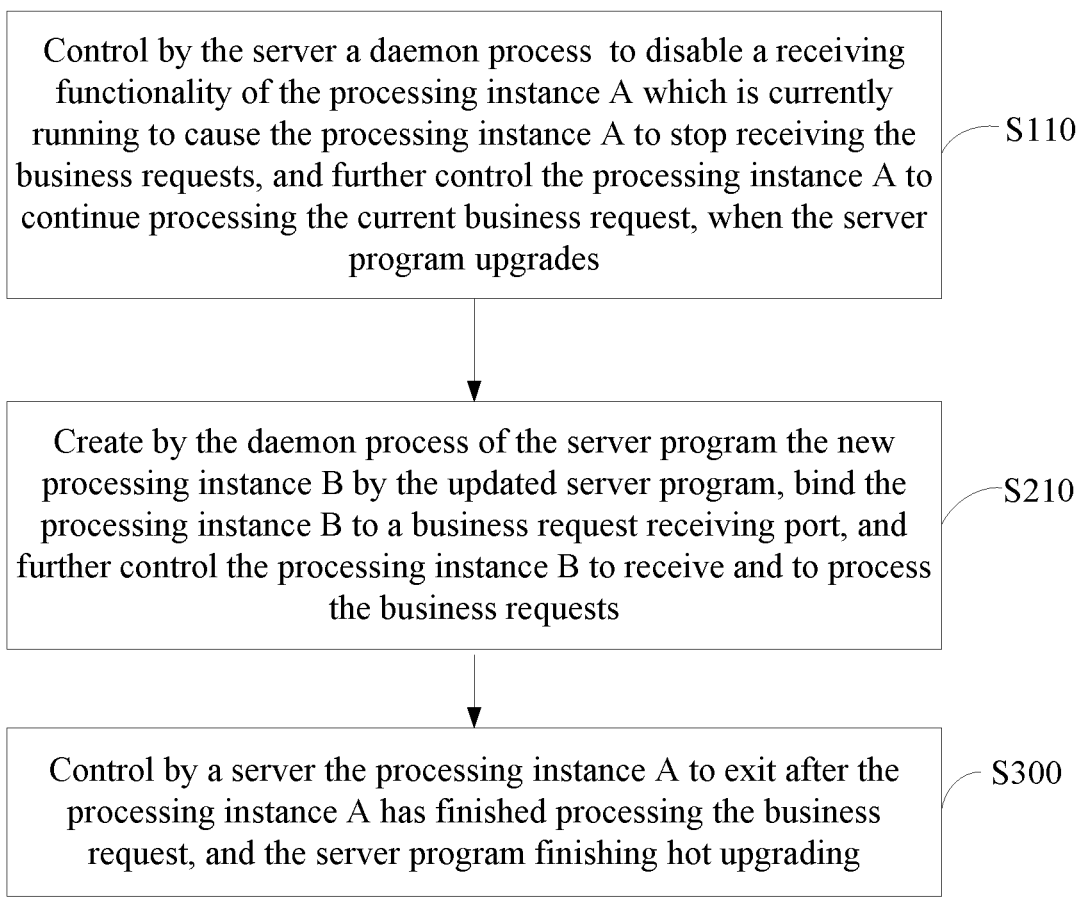
FIG. 2 is a flowchart of a second embodiment of a server program hot upgrading method.

FIG. 2 illustrates a second embodiment of a server program hot upgrading method. Based on the above first embodiment, the step S100 of "the server controlling a processing instance A which is currently running to stop receiving business requests and to continue processing a current business request when the server program upgrades" further comprises:

step S110, the server controls a daemon process to disable a receiving functionality of the processing instance A which is currently running to cause the processing instance A to stop receiving the business requests, and further controls the processing instance A to continue processing the current business request, when the server program upgrades;

To manage the processing instances more conveniently, when the server program upgrades, the server controls the daemon process to manage the receiving functionality of the processing instance, disable the receiving functionality of the processing instance A which is currently running to cause the processing instance A to stop receiving the business requests. However, the processing instance A continues processing the current business instance to keep the service connection, thus, the user cannot sense that the sever program upgrades.

The step S200 of "the server creating a new processing instance B by the updated server program, to process the business requests received by the processing instance B" further comprises following step:

step S210, the daemon process of the server program creates the new processing instance B by the updated server program and binds the processing instance B to a business request access port, and further controls the processing instance B to receive and to process the business requests.

To ensure that the server program continues providing services for processing business requests, the server controls the daemon process to create the new processing instance B by the updated server program, and binds the processing instance B to the business request access port. At the same time, the server controls the processing instance B to receive and to process the business requests.

In operation, the steps of this embodiment comprises following steps:

1. the daemon process detects signal;
2. when the daemon process detects an upgrading signal, the daemon process initials a new process from a same business request access port, that is, the daemon process creates the new processing instance and binds the new processing instance to the business request access port.
3. disable the receiving functionality of the current process, after the current process has finished processing the current business request, the current process exits, that is, the server disconnects the old processing instance to cause the old processing instance to stop receiving the business requests, at the same time, the old processing instance continues processing the current business request and exits the current business request is finished.

Based on the advantage of the above embodiment, the processing instances of this embodiment are managed by the daemon process. Thus, when the server program upgrades, the unified management of the daemon process can allow the processing instances to be switched more smoothly, allow the server to continue providing services for processing business requests when the server program upgrades, and further prevent the data from being lost or generating errors when the server restarts.

Figure 3:
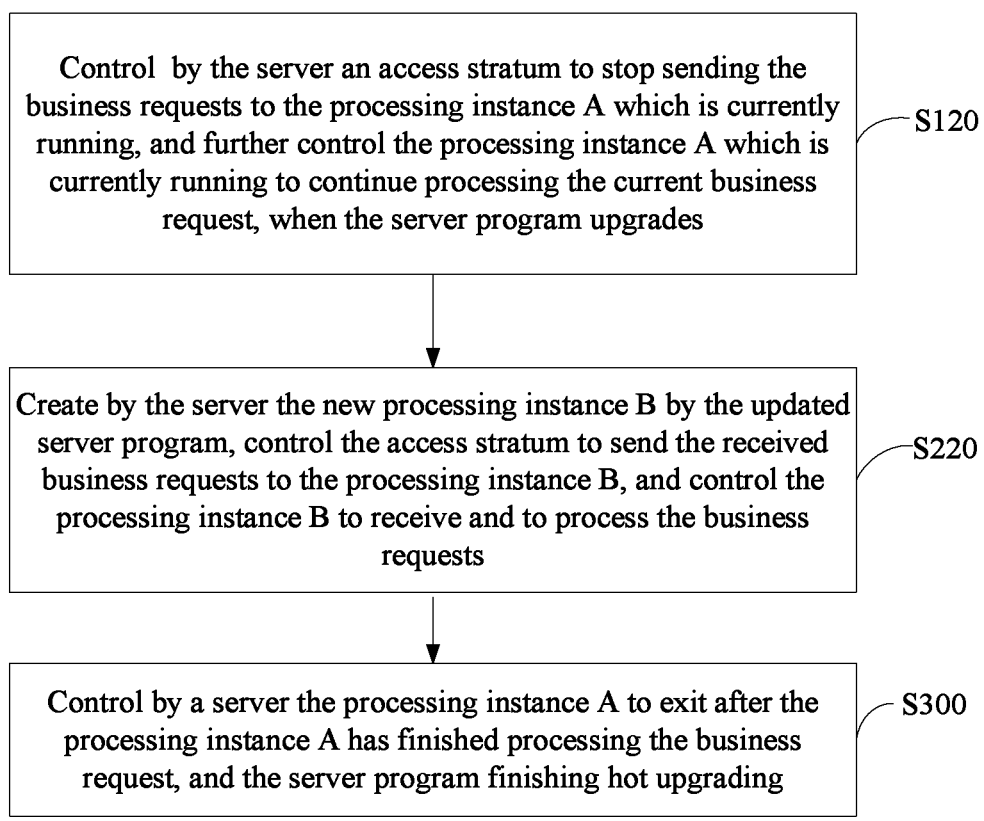
FIG. 3 is a flowchart of a third embodiment of a server program hot upgrading method.

Furthermore, FIG. 3 illustrates a third embodiment of a server program hot upgrading method. Based on the first embodiment of FIG. 1, the step S100 of "the server controlling a processing instance A which is currently running to stop receiving business requests and to continue processing a current business request when the server program upgrades" further comprises:

Step S120, the server controls an access stratum to stop sending the business requests to the processing instance A which is currently running, and further controls the processing instance A which is currently running to continue processing the current business request, when the server program upgrades.

The server program is divided into the access stratum and a backend service stratum. The access stratum is configured to communicate with the client, receive the business requests from the client, and sends the received business requests to the backend service stratum. The backend service stratum provides services for processing the business requests by the processing instances. When the service program upgrades, the server controls an access stratum to stop sending the business requests to the processing instance which is currently running, that is, and to stop sending the business requests to the processing instance A, and further controls the processing instance A which is currently running to continue processing the current business request to avoid an interruption of the services for processing the business requests.

The step S200 of "the server creating a new processing instance B by the updated server program, to process the business requests received by the processing instance B" further comprises following step:

Step S220, the server creates the new processing instance B by the updated server program, controls the access stratum to send the received business requests to the processing instance B, and controls the processing instance B to receive and to process the business requests.

The server creates the new processing instance, namely the processing instance B, and controls the access stratum to send the received business requests to the processing instance B. The processing instance B receives and processes the business requests, thereby allowing the new business requests to be successively received and processed when the server program upgrades.

In operation, take a single server for example, the steps of this embodiments comprises:

1. the server is deployed by separating the access stratum and the backend service stratum
2. when the server program upgrades, two backend processing instances are deployed, the request flows are leaded to the new backend processing instances by the access stratum, to cause the new backend processing instances to receive and to process the business requests;
3. the old backend processing instance continues processing the current the business request and then exits after the business request is finished.

Based on the advantage of the above embodiment, the access stratum of this embodiment allocates the business request, thereby allowing the new business requests to be leaded to the new processing instances when the server program upgrades, and allowing the processing instances to be switched more smoothly, thus avoiding an interruption of processing the business requests when the server program upgrades, further preventing the data from being lost or generating errors when the server program upgrades. Moreover, connection and data business can be switched on a single server.

Figure 4:
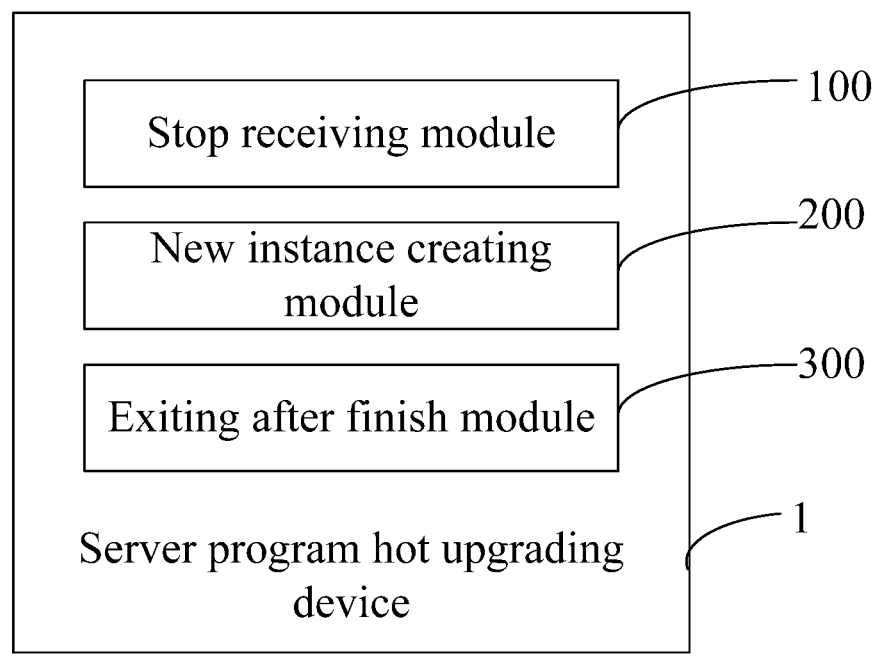
FIG. 4 is block diagram of a first embodiment of a server program hot upgrading device.

FIG. 4 illustrates a first embodiment of a server program hot upgrading device 1 comprising:

a stop receiving module 100 configured to control a processing instance A which is currently running to stop receiving business requests and to continue processing a current business request when the server program upgrades;

The server keeps running the processing instance A which is currently running (that is, an old processing instance) and controls the processing instance A to continue processing the current business request when the server program upgrades, thereby preventing the processing instance A to the process new business requests. Thus, the processing instance A stops receiving the new business requests.

a new instance creating module 200 configured to create a new processing instance B by the updated server program, to process the business requests received by the processing instance B;

The new instance creating module 200 creates the new processing instance B by the updated server program. When the new processing instance B is created, the server controls the new processing instance B to process the new business requests, thereby preventing the service connection from being interrupted when the server program upgrades. Thus, the user cannot sense that the server program upgrades.

an exiting after finish module 300 configured to control the processing instance A to exit after the processing instance A has finished processing the business request, and the server program finishes hot upgrading.

The server controls the processing instance A to exit after the processing instance A has finished processing the business request, and the server program finishes hot upgrading. The new business requests are processed by the processing instance B. That is, after the server program upgrades, there is only the processing instance B which processes the new business requests. It is foreseeable that the occupied resources are released when the processing instance A exits.

In the embodiment, the new processing instance is created which processes the new business requests when the server program upgrades, at the same time, the old processing instance continues processing the current business request. Thereby, the server doesn't need to restart when the server program upgrades, and no interruption of the service connection occurs. Thus, the user cannot sense that the server program upgrades. Furthermore, since the server doesn't need to restart, thus preventing the data from being lost which is caused by an interruption of operations including the file operation when the server restarts.

Figure 5:
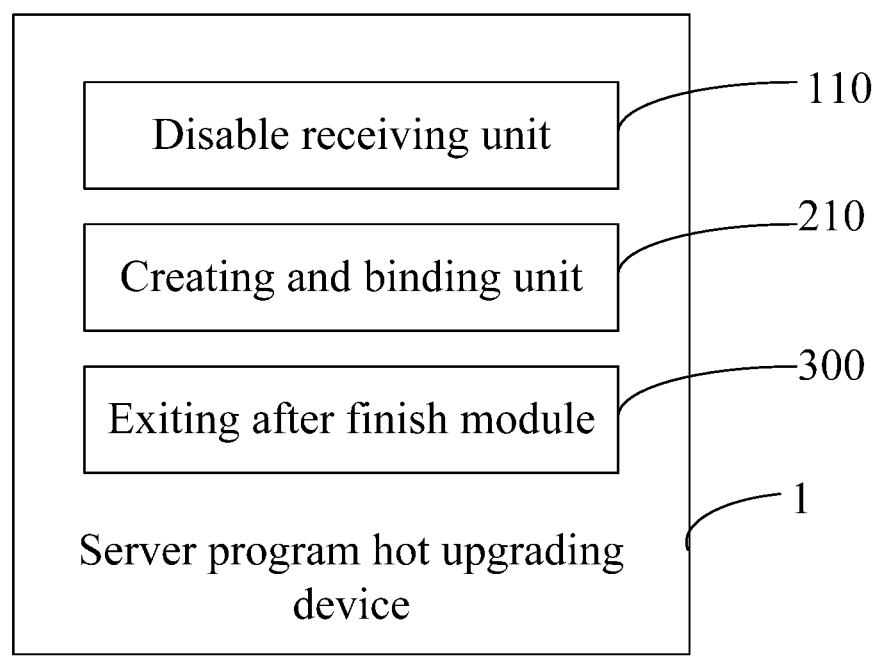
FIG. 5 is block diagram of a second embodiment of a server program hot upgrading device.

FIG. 5 illustrates a second embodiment of a server program hot upgrading device 1. Based on the above first embodiment of FIG. 4, the stop receiving module 100 further comprises:

a disable receiving unit 110 configured to control a daemon process of the server program to disable a receiving functionality of the processing instance A which is currently running to cause the processing instance A to stop receiving the business requests, and further configured to control the processing instance A to continue processing the current business request, when the server program upgrades.

To manage the processing instances more conveniently, when the server program upgrades, the server controls the daemon process to manage the receiving functionality of the processing instance, disable the receiving functionality of the processing instance A which is currently running to cause the processing instance A to stop receiving the business requests. However, the processing instance A continues processing the current business instance to keep the service connection, thus, the user cannot sense that the sever program upgrades.

The new instance creating module 200 further comprises:

a creating and binding unit 210 configured to control the daemon process of the server program to create the new processing instance B by the updated server program and bind the processing instance B to a business request access port, and further configured to control the processing instance B to receive and to process the business request.

To ensure that the server program continues providing services for processing business requests, the server controls the daemon process to create the new processing instance B by the updated server program, and binds the processing instance B to the business request access port. At the same time, the server controls the processing instance B to receive and to process the business requests.

In operation, the steps of this embodiment comprises following steps:

1. the daemon process detects signal;

2. when the daemon process detects an upgrading signal, the daemon process initials a new process from a same business request access port, that is, the daemon process creates the new processing instance and binds the new processing instance to the business request access port.

3. disable the receiving functionality of the current process, after the current process has finished processing the current business request, the current process exits, that is, the server disconnects the old processing instance to cause the old processing instance to stop receiving the business requests, at the same time, the old processing instance continues processing the current business request and exits the current business request is finished.

Based on the advantage of the above embodiment, the processing instances of this embodiment are managed by the daemon process. Thus, when the server program upgrades, the unified management of the daemon process can allow the processing instances to be switched more smoothly, allow the server to continue providing services for processing business requests when the server program upgrades, and further prevent the data from being lost or generating errors when the server restarts.

Figure 6:
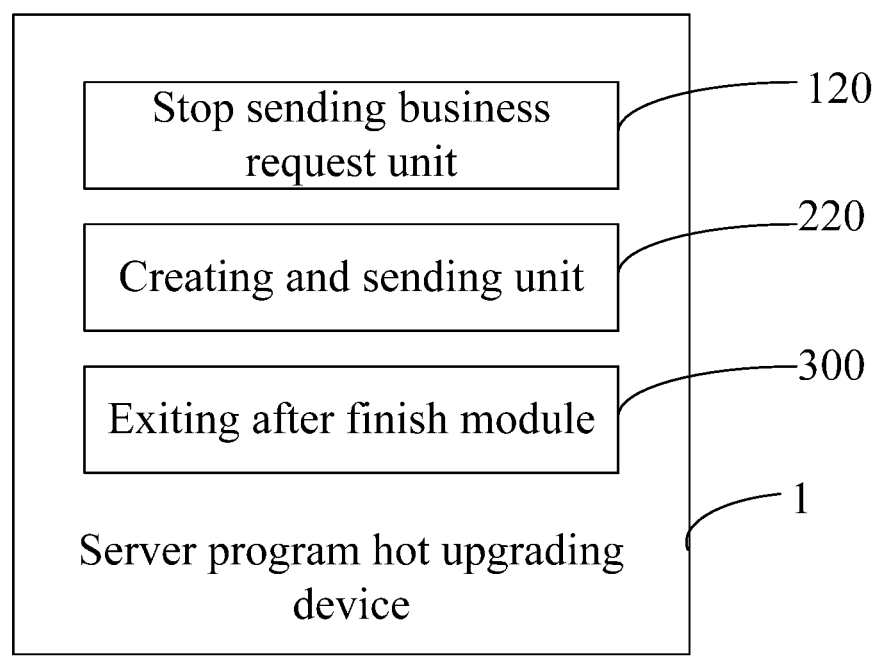
FIG. 6 is block diagram of a third embodiment of a server program hot upgrading device.

Furthermore, FIG. 6 illustrates a third embodiment of a server program hot upgrading device 1. Based on the first embodiment of FIG. 4, the stop receiving module 100 further comprises:

a stop sending business request unit 120 configured to control an access stratum to stop sending the business requests to the processing instance A which is currently running, and further control the processing instance A which is currently running to continue processing the current business request, when the server program upgrades.

The server program is divided into the access stratum and a backend service stratum. The access stratum is configured to communicate with the client, receive the business requests from the client, and sends the received business requests to the backend service stratum. The backend service stratum provides services for processing the business requests by the processing instances. When the service program upgrades, the server controls an access stratum to stop sending the business requests to the processing instance which is currently running, that is, and to stop sending the business requests to the processing instance A, and further controls the processing instance A which is currently running to continue processing the current business request to avoid an interruption of the services for processing the business requests.

The new instance creating module 200 further comprises:

a creating and sending unit 220 configured to create the new processing instance B by the updated server program, control the access stratum to send the received business requests to the processing instance B, and control the processing instance B to receive and to process the business requests.

The creating and sending unit 220 creates the new processing instance, namely the processing instance B, and controls the access stratum to send the received business requests to the processing instance B. The processing instance B receives and processes the business requests, thereby allowing the new business requests to be successively received and processed when the server program upgrades.

In operation, take a single server for example, the steps of this embodiments comprises:

1. the server is deployed by separating the access stratum and the backend service stratum 2. when the server program upgrades, two backend processing instances are deployed, the request flows are leaded to the new backend processing instances by the access stratum, to cause the new backend processing instances to receive and to process the business requests;

3. the old backend processing instance continues processing the current the business request and then exits after the business request is finished.

Based on the advantage of the above embodiment, the access stratum of this embodiment allocates the business request, thereby allowing the new business requests to be leaded to the new processing instances when the server program upgrades, and allowing the processing instances to be switched more smoothly, thus avoiding an interruption of processing the business requests when the server program upgrades, further preventing the data from being lost or generating errors when the server program upgrades. Moreover, connection and data business can be switched on a single server.

What described above are only preferred embodiments of the present disclosure but are not intended to limit the scope of the present disclosure. Accordingly, any equivalent structural or process flow modifications that are made on basis of the specification and the attached drawings or any direct or indirect applications in other technical fields shall also fall within the scope of the present disclosure.

I claim:

1. A server program hot upgrading method, comprising following steps:
    the server controlling a processing instance A which is currently running to stop receiving business requests and to continue processing a current business request when the server program upgrades;
    the server creating a new processing instance B, which is different than the processing instance A, by the updated server program, to process the business requests received by the processing instance B;
    the server controlling the processing instance A to exit after the processing instance A has finished processing the business request, and the server program finishing hot upgrading
    wherein, the server program is divided into an access stratum and a backend service stratum, the access stratum is configured to communicate with a client, receive the business request from the client, and send the received business request to the backend service stratum, the backend service stratum is configured to provide service for processing the business request by the processing instances;
    wherein the step of the server controlling a processing instance A which is currently running to stop receiving business requests and to continue processing a current business request when the server program upgrades further comprises the following step:
    the server controlling the access stratum to stop sending the business requests to the processing instance A which is currently running, and further controlling the processing instance A which is currently running to continue processing the current business request, when the server program upgrades.

2. The server program hot upgrading method of claim 1, wherein the step of "the server creating a new processing instance B by the updated server program, to process the business requests received by the processing instance B" further comprises the following step:
    the server creating the new processing instance B by the updated server program, controlling the access stratum to send the received business requests to the processing instance B, and controlling the processing instance B to receive and to process the business requests.

3. A server program hot upgrading device comprising one or more processors and a non-transitory program storage medium storing program code executable by the one or more processors, the program code comprising:
    a stop receiving module configured to control a processing instance A which is currently running to stop receiving business requests and to continue processing a current business request when the server program upgrades;
    a new instance creating module configured to create a new processing instance B, which is different than the processing instance A, by the updated server program, to process the business requests received by the processing instance B;
    an exiting after finish module configured to control the processing instance A to exit after the processing instance A has finished processing the business request, and the server program finishes hot upgrading;
    wherein, the server program is divided into an access stratum and a backend service stratum, the access stratum is configured to communicate with a client, receive the business request from the client, and send the received business request to the backend service stratum, the backend service stratum is configured to provide service for processing the business request by the processing instances;
    wherein the stop receiving module further comprises:
    a stop sending business request unit configured to control an access stratum to stop sending the business requests to the processing instance A which is currently running, and further control the processing instance A which is currently running to continue processing the current business request, when the server program upgrades.

4. The server program hot upgrading device of claim 3, wherein the new instance creating module further comprises:
- a creating and sending unit configured to create the new processing instance B by the updated server program, control the access stratum to send the received business requests to the processing instance B, and control the processing instance B to receive and to process the business requests.

* * * * *